(12) United States Patent
Lee

(10) Patent No.: US 6,770,348 B2
(45) Date of Patent: Aug. 3, 2004

(54) THREE-DIMENSIONAL IMAGING DECORATING SHEET AND THE METHOD FOR MANUFACTURING THE SAME

(76) Inventor: Bao-Feng Lee, 235 Chung-Ho Box 8-24, Taipei (TW)

( * ) Notice: Subject to any disclaimer, the term of this patent is extended or adjusted under 35 U.S.C. 154(b) by 92 days.

(21) Appl. No.: 10/016,396

(22) Filed: Dec. 17, 2001

(65) Prior Publication Data

US 2003/0111755 A1 Jun. 19, 2003

(51) Int. Cl.[7] .......................... B32B 3/02; A63H 27/00
(52) U.S. Cl. .................. 428/66.5; 428/66.7; 428/156; 428/187; 428/192; 428/913; 473/588; 446/46
(58) Field of Search .................. 428/29, 30, 156, 428/187, 212, 542.2, 9, 3.3, 66.4, 66.5, 66.7, 192, 913; 473/588, 590; 446/46

(56) References Cited

U.S. PATENT DOCUMENTS

| | | | | |
|---|---|---|---|---|
| 2,482,094 A | * | 9/1949 | Chavannes et al. | 428/187 |
| 3,364,090 A | * | 1/1968 | Slipp | 428/187 |
| 4,205,484 A | * | 6/1980 | Kovac et al. | 446/46 |
| 5,352,532 A | * | 10/1994 | Kline | 428/34 |

* cited by examiner

Primary Examiner—Donald J. Loney

(57) ABSTRACT

A three-dimensional imaging decorating sheet made by injection molding or plastic-molding and method for manufacturing the same is disclosed. The decorating sheet is a semi-transparent thin plastic plate and has non-flat embossment figures on surfaces thereof. Therefore, as a backside of the decorating sheet faces to a light source, a three-dimensional image will present to the viewer. The method for manufacturing a three-dimensional imaging decorating sheet is disclosed so that a thin plate has embossment figures at one surface or two surface. The method comprises the steps of: inputting figures to a computer for performing predetermined processing; performing chromatography to the input figures; converting the result of the chromatography into control codes; inputting the control codes to a CNC machine for machining an mold; and injecting plastics or rubbers to the mold to form a plastic decorating sheet.

2 Claims, 8 Drawing Sheets

THREE-DIMENSIONAL IMAGING DECORATING SHEET AND THE METHOD FOR MANUFACTURING THE SAME

BACKGROUND OF THE INVENTION

1. Field of the Invention

The present invention relates to decorating sheet, and particularly to a three-dimensional imaging decorating sheet and the method for manufacturing the same. The three-dimensional imaging decorating sheet is suitable for flyable rotary disks, plastic toys, stationeries, name card boxes, household utensils, etc.

2. Description of Related Art

The conventional three dimensional (3D) decorating sheets have 3D figures on the decorating sheets despite of making by injection molding or embossing so that a 3D images can be presented as viewed by people. The embossment figures are similar to current relief printing or photogravure. However, the decorating sheets can not present a transparent image with bright and dark effects. The reason is that the conventional two-dimensional decorating sheet has poor effect in perspective view. The prior decorating sheets are too thick and thus have poor transparency. Moreover, the prior art decorating sheet cannot present different layers of light effect. As a result they cannot present a vivid perspective view.

SUMMARY OF THE INVENTION

Accordingly, the primary object of the present invention is to provide a three-dimensional imaging decorating sheet made by injection molding or plastic-molding and method for manufacturing the same. The decorating sheet is a semi-transparent thin plastic plate and has embossment figures on surfaces thereof which are not flat. Therefore, as a backside of the decorating sheet faces to a light source, a three-dimensional image will present to the viewer.

Another object of the present invention is to provide a method for manufacturing a three-dimensional imaging decorating sheet so that a thin plate has embossment figures at one surface or two surface. The method comprises the steps of: inputting figures to a computer for performing predetermined processing; performing chromatography to the input figures; converting the result of the chromatography into control codes; inputting a control program to a CNC machine for machining an mold; and injecting or plastic-molding an integral-formed plastic decorating sheet by the mold.

The various objects and advantages of the present invention will be more readily understood from the following detailed description when read in conjunction with the appended drawing.

DETAILED DESCRIPTION OF THE PREFERRED EMBODIMENTS

Figure 1:
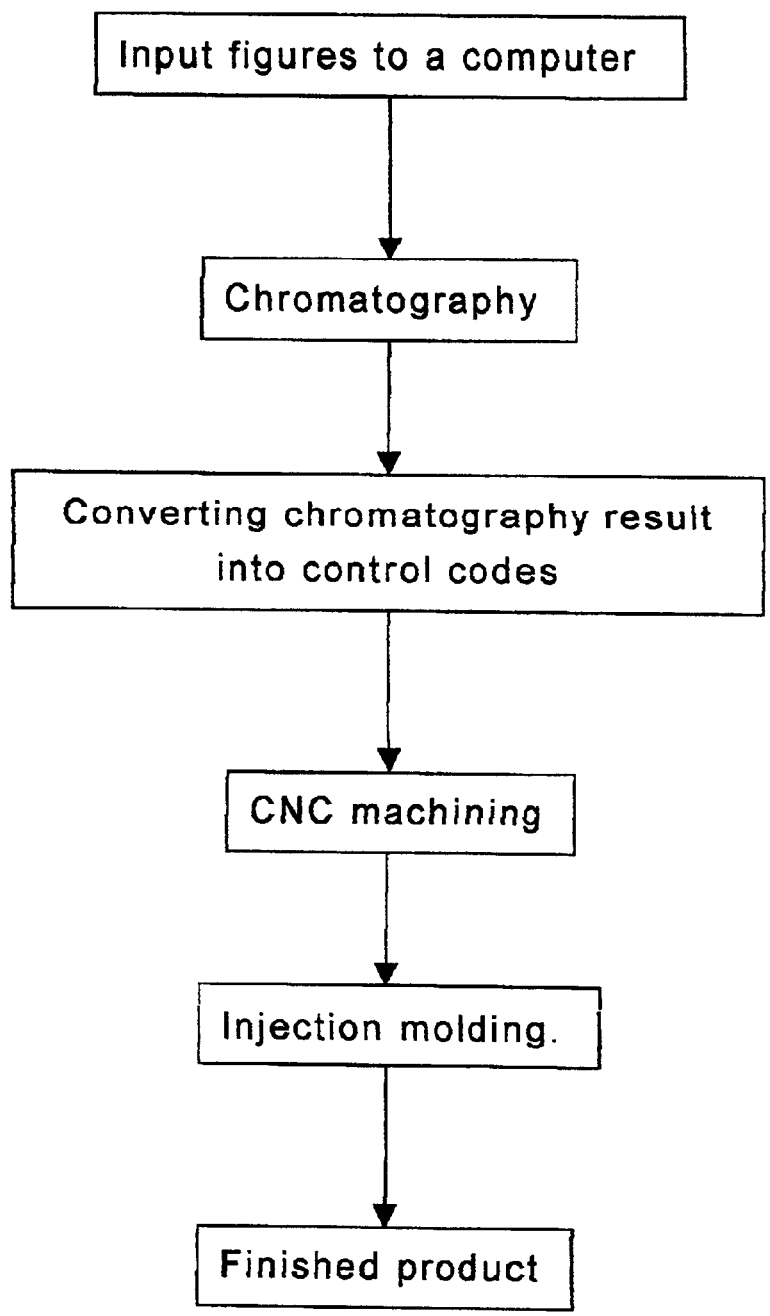
FIG. 1 shows the process for manufacturing the three-dimensional imaging decorating sheet of the present invention.

Referring to FIG. 1, the embodiment of the present invention will be described herein.

FIG. 1 shows a flow diagram of three-dimensional imaging decorating sheet of the present invention. The manufacturing process of the decorating sheet includes the following steps.

(1) Input figures, such as LOGOs of a company, images of people, scenery, drawings, photographs, cartoon figures, etc., to be displayed to a computer;

(2) Perform chromatography to the input figures;

(3) Convert the result of the chromatography into control codes;

(4) Input the control code to a CNC machine for machining an mold; and (5) Inject or plastic-mold an integral-formed plastic decorating sheet 10 by the mold.

Figure 2:
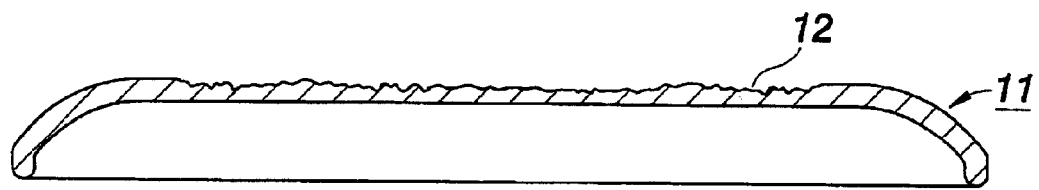
FIG. 2 is a cross section view of the decorating sheet of the present invention.
Figure 12:
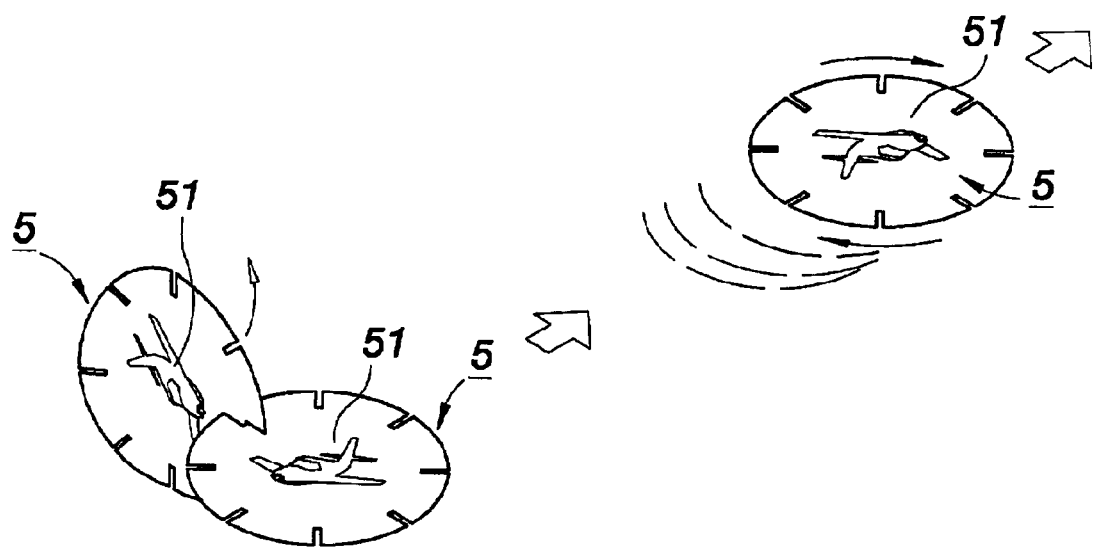
FIG. 12 is a schematic view showing an application of the game card of FIG. 11.

Referring to FIG. 2, a cross section view of the plastic decorating sheet is illustrated. This plastic decorating sheet can be used in many objects. For example, the flyable rotary disk 11 has a 3D (three embossment) FIG. 12 after being shaped. The FIG. 12 is transparent. When light 6 passes to this region, the viewer may view the 3D figures therein so as to present a vivid effect. This will be further described hereinafter.

Figure 3:
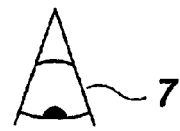
FIG. 3 is a perspective view showing a flyable rotary disk of the present invention viewed by eyes.
Figure 3:
Figure 3:
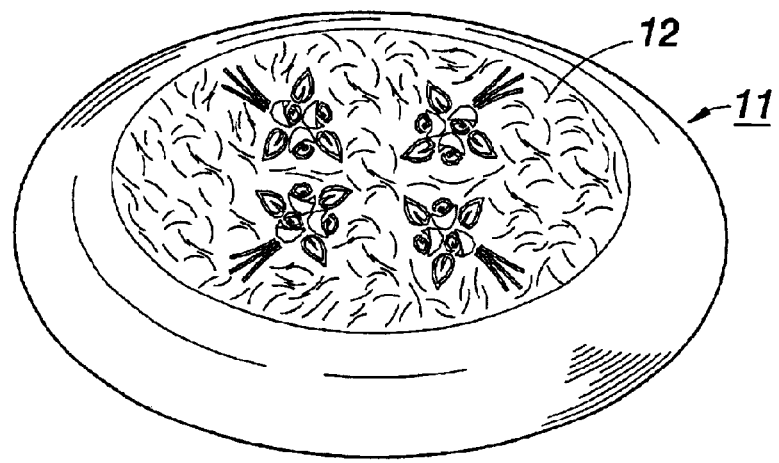
Figure 4:
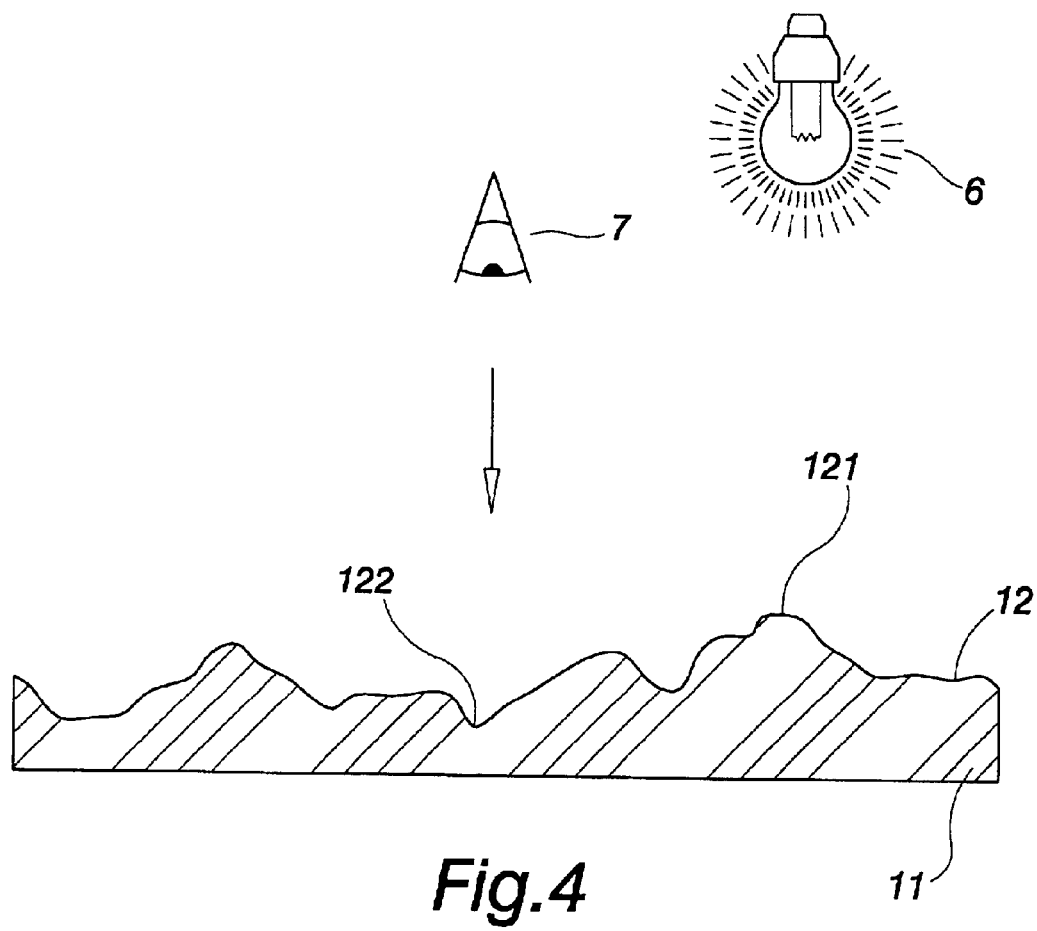
FIG. 4 is a partial cross section view showing a flyable rotary disk of the present invention viewed by eyes.
Figure 5:
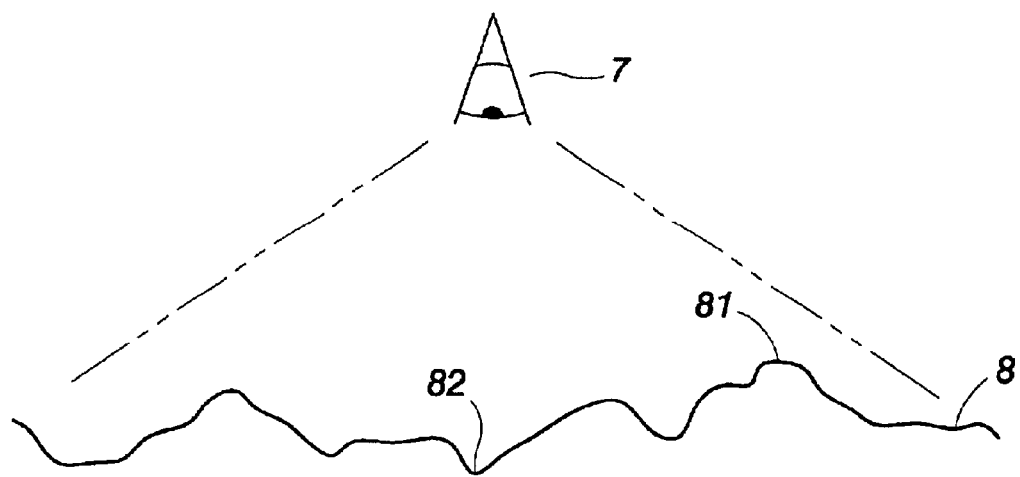
FIG. 5 shows an outlook of a flyable rotary disk of the present invention viewed by eyes.

Referring to FIGS. 3 and 4, the perspective view and partial cross section view of the flyable rotary disk according to the present invention is illustrated. The plastic flyable rotary disk 11 has a surface with a 3D embossment FIG. 12 which is a transparent decorating region and is not a flat region. When the user views the embossment FIG. 12 by eyes, the 3D outlook (referring to FIG. 5) is identical to the embossment FIG. 12. That is, the outlook presents the 3D image of the figure. The convex portions 81, 121 present as dark regions, while the concave portions 82, 122 presents as bright regions. For example, those having deep colors, such as hairs, eyebrows, pupils, etc., are presented by convex portions and shows with dark color, while the face, hands, and legs are presented by light colors. Therefore, when the eyes of the viewer are at the same direction of the light source 6, only the embossment figure of the decorating sheet is viewed, as illustrated in FIG. 6.

Figure 6:
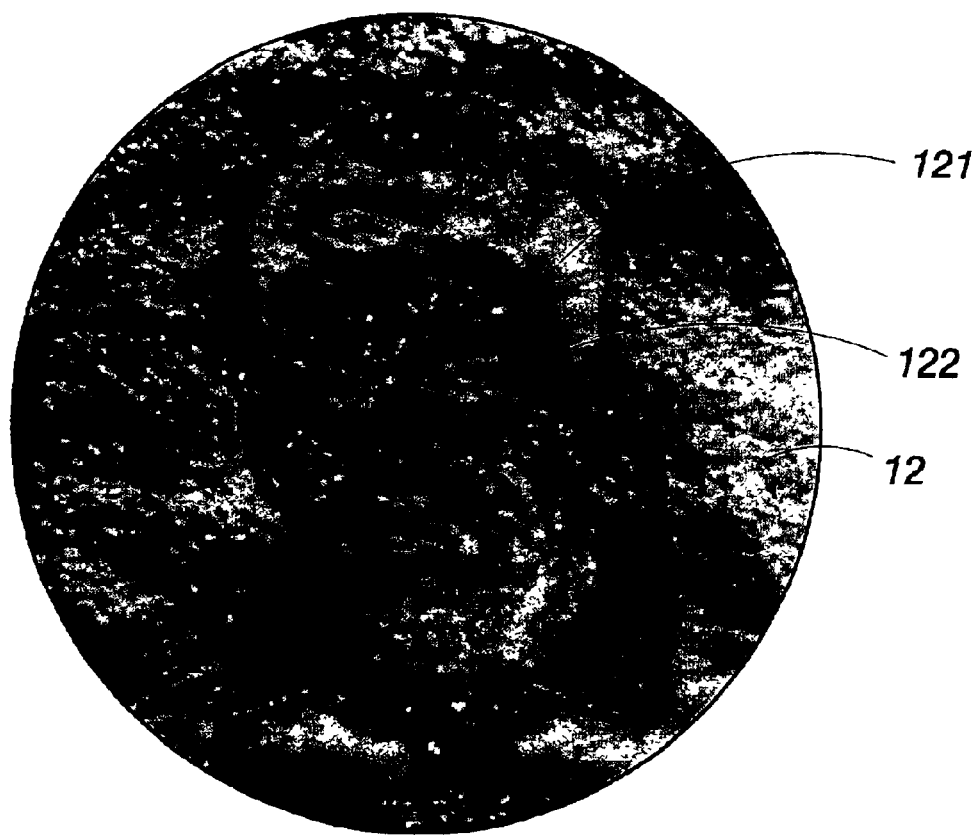
FIG. 6 shows a flyable rotary disk of the present invention with a figure of a person thereon.
Figure 7:
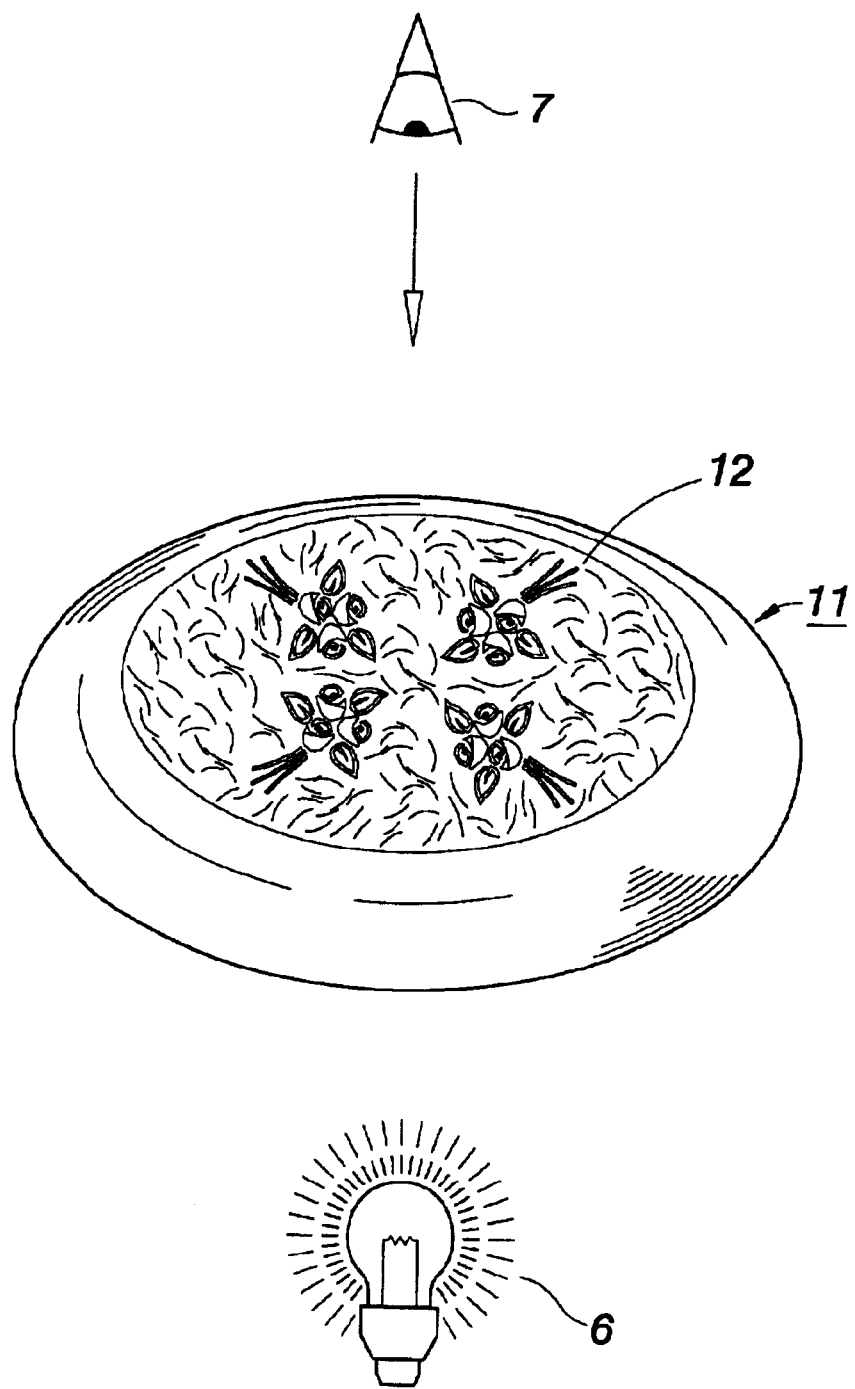
FIG. 7 is a schematic view showing a flying rotary disk of the present invention viewed by eyes.
Figure 8:
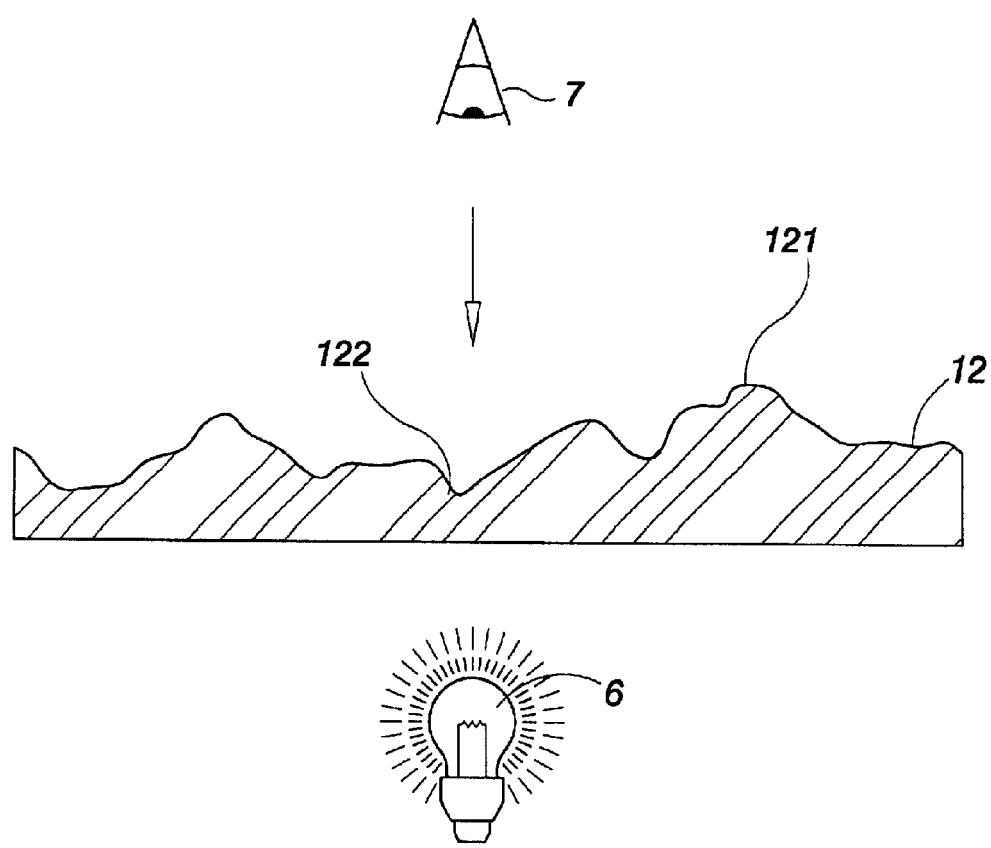
FIG. 8 is a partial cross section view showing a flying rotary disk of the present invention viewed by eyes.
Figure 9:
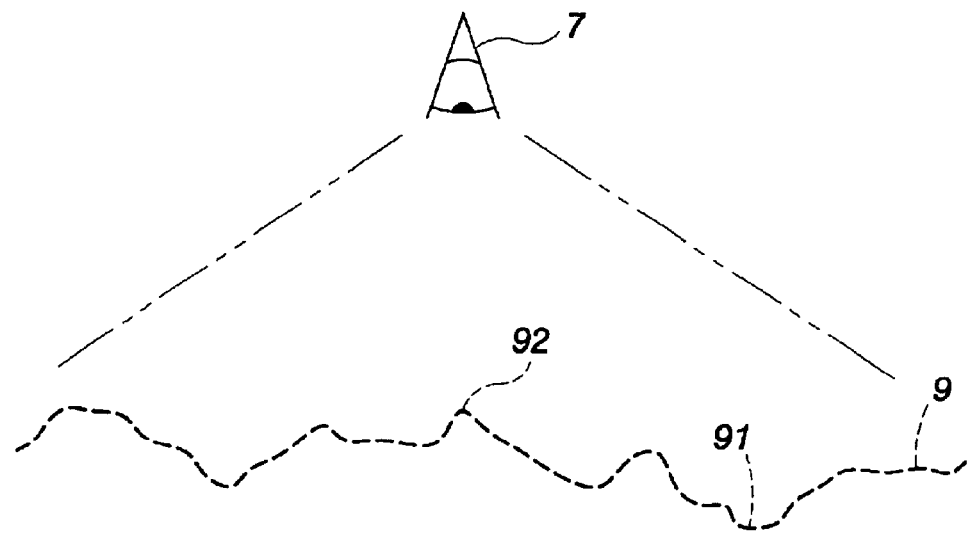
FIG. 9 is a perspective view showing a flying rotary disk of the present invention viewed by eyes.
Figure 10:
FIG. 10 is a perspective view of a flying rotary disk of the present invention with a figure of a person thereon.

Referring to FIGS. 6, and 8, a schematic view and partial cross section view of the figures view by the eyes according to the present invention is illustrated. A transparent or semi-transparent flyable rotary disk 11 has a surface with a 3D embossment FIG. 12 formed thereon and thus the surface is not flat. The thickness portion 121 may absorb more light and thus presents as dark regions, while the thin portion 122 presents with bright regions. Different layers present different light effects. Therefore, as the backside of the flyable rotary disk faces to the light source 6, the figures with layers of different light effects can be viewed and as a result a 3D outlook 9 as illustrated in FIG. 9 is shown. The dark region 91 in this outlook is the thick portion 121 of the 3D figures, and the bright portion 92 of this outlook is the thin portion 122. It is apparent that the outlook 9 is opposite to the shape of the embossment FIG. 12. Because of the layers of different light effects, it presents as a vivid 3D practical figures, as shown in the FIG. 10.

Figure 11:
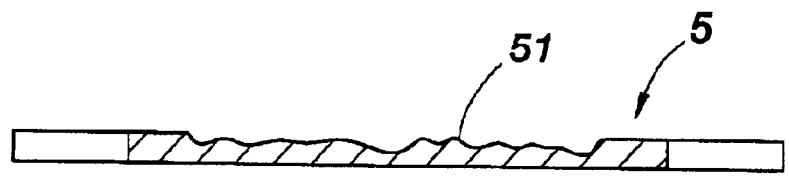
FIG. 11 is a schematic cross sectional view showing that the present invention is applied to a children game card.

With reference to FIG. 11, a schematic cross sectional view showing that the present invention is used in a children game card is illustrated. In this embodiment, a three-dimensional embossment FIG. 51 is formed on a plastic surface of the children game card. This 3D embossment FIG. 51 is a transparent decorating region. When light passes through this transparent three-dimensional embossment FIG. 51, a vivid 3D figure will present. Referring to FIG. 12, a 3D cartoon round sheet is shown. This sheet has not only the functions of rotation and flying, but also presents as a 3D transparent figures Similarly, the present invention can be used other plastic toys, stationeries, name card boxes, household utensils, etc. Therefore, the toys have dual functions.

Other than forming an embossment figure on one surface of the plastic decorating sheet, figures can be formed at two surfaces of the decorating sheet, while in this condition, the two figures must be symmetrical. Otherwise, the images formed by light passing through the figures will present as an image of non-aligned two overlapping figures In summary, other than the embossment figure on the decorating sheet of the present invention, after radiating by a light source, the thin regions will has a clear image, while the thick regions have an unclear image. Therefore, the present invention presents an image different from those generated by the prior art. Although the decorating sheet of the present invention is made by injection molding, the decorating sheet of the present invention has a plate-like shape which is not flat so as to present special visual effect as radiating by light.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A flying rotary disk with a three-dimensional imaging decorating sheet comprising:

a decorating sheet being a semi-transparent thin plastic plate and having a non-flat embossment figure on a surfaces thereof; the embossment figure a not uniform in thickness; thick regions of the embossment figures present as a dark image when they are radiated by light and thin regions of the embossment figures present as a bright image when they are radiated by light; therefore, as a backside of the decorating sheet faces to a light source, a three-dimensional image will present to the viewer; and a peripheral portion around the decorating sheet and having a round outer edge.

2. The flying rotary disk as claimed in claim 1, wherein a plurality of slots are formed around an outer side of the peripheral portion.

* * * * *